July 23, 1940. R. STERZENBACH 2,209,239
FLEXIBLE METAL PIPE
Filed March 6, 1939

Inventor:
RALPH STERZENBACH
by C. P. Goepel
Attorney

Patented July 23, 1940

2,209,239

UNITED STATES PATENT OFFICE 2,209,239

FLEXIBLE METAL PIPE

Ralph Sterzenbach, Berlin, Germany

Application March 6, 1939, Serial No. 260,124
In Germany March 15, 1938

1 Claim. (Cl. 138—52)

This invention relates to a tubular connection or junction piece to be incorporated in a conduit, especially for hot gases containing condensible fluids such as tar, etc. By the invention there is obtained a fitting which, even with very high temperatures of the gases under flow, provides a seal against the escape of gases and liquids. Further, the connection is capable of variation in length and of flexing in operation without the gas-tightness or liquid-tightness being affected. The extent of variation in length and the degree of flexure may be much greater than feasible with pipes heretofore known; also the sealing properties are maintained, even if in consequence of powerful vibrations changes of direction and/or of length recur at very short intervals, that is, if the connection is subjected to powerful vibrations.

A main field of use for the improved junction piece is for connection to exhaust pipes of aircraft, for example, between the engine and the exhaust pipe proper. In consequence of the differences in the mass between such exhaust pipes and the engines to which they are connected, the pipes have a vibration of their own which differs materially from that of the engines. Displacements of many millimetres or even of centimetres cannot therefore be avoided. With the connection of a junction piece according to the invention such displacements may take place without damage to the exhaust pipe, which itself may be of any desired type. Tubular junction pieces according to the invention may with a structural length of, for example, 20 centimetres, flex for about 3 centimetres without necessarily extending and/or shortening. They are also able to withstand extremely powerful, numerous and rapid vibrations.

Broadly the invention consists in a gas-tight and liquid-tight tubular junction piece or connection, capable of permitting longitudinal movement and flexure, preferably for conducting high temperature gases, composed of similar adjoining rings each having oppositely curved out-turned ends, the out-turned end of one ring being adapted to slide and roll on the inner face of an adjoining ring, and a cover-ring overlapping the adjacent out-turned ends of two adjoining rings.

The cover-ring serves as a cover for a heat-resisting packing, for example, of asbestos, fitted in the channel or gutter formed by out-turning the lower end of one ring and following the movement of said channel or gutter.

Figure 1:
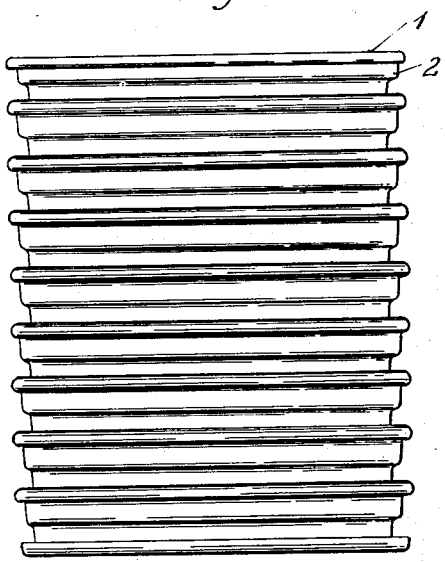

A preferred embodiment of the invention is illustrated in the accompanying drawing in which Fig. 1 is an outside view of the improved tubular junction piece or connection.

Figure 2:
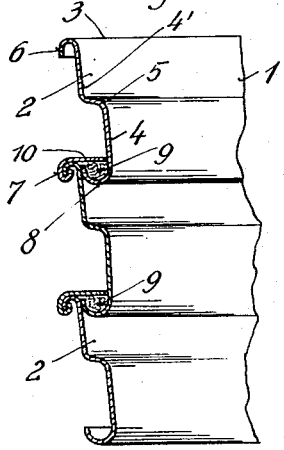

Fig. 2 is a fragmentary section to a larger scale.

Referring to the drawing, the junction piece 1 consists of similar rings 2 jointed one within the other, which rings may be of circular or oval form in cross section. Each of said rings 2, of heat-resisting steel or heat-resisting alloy, comprises several adjoined arcuate components. The main body 3 of each ring or section is formed of parts 4 and 4' respectively reduced and enlarged in diameter with a curved transition part 5 connecting the same. The part 4' merges into an overturned roll or flange 6. The part 4 merges into an upturned flange or gutter 8.

Two adjacent rings are jointed together by means of a collar or ring 7 engaging the overturned flange 6 of the lower ring (Fig. 2) and covering the gutter 8 of the upper ring. Asbestos packing 9 is interposed between the ring 7 and the gutter 8. The asbestos packing 9 is entirely enveloped by metal both externally and internally.

Pronounced longitudinal movement of the tubular junction piece is permitted by reason that the edge 10 of one ring 3 slides with practically only line contact on the engaging ring, so that there is only a slight resistance to movement both when the junction piece is being extended and when it is being collapsed. In either position the seal is maintained. The cover-ring 7 presents no obstacle to the relative movement of the rings 3.

It is also possible for the gutter portion 8 of one ring 3 to rock or roll on the part 4' of another ring 3 with only slight resistance to the rolling movement. Also in this case the seal is maintained. In consequence of the co-operation of the rounded flange or gutter 8 of one ring with the enlarged diameter part 4' of the adjoining ring 3 there is effected under the influence of the forces set up uniform shift of the entire ring in one direction, or non-uniform shift at the periphery—which corresponds to flexure.

I claim:

A device of the character described comprising mutual interfitting sections having parts of small and enlarged diameter, out-turned substantially semi-cylindrical flanges at the ends of the sections with the open sides of said semi-cylindrical flanges disposed mutually inward of the sections toward one another, the flange on the inner section fitting slidingly and rockingly in and upon the inner wall of the part of large diameter of an adjoining section, a packing material lodged in the semi-cylindrical flange of the small diameter part, and a retaining ring extending across the open side of said flange containing the packing and having its outer portion bent and interlocked with the semi-cylindrical flange on the part of large diameter of said adjoining section.

RALPH STERZENBACH.